United States Patent [19]

Hasuo et al.

[11] 4,381,383

[45] Apr. 26, 1983

[54] PROCESS FOR PRODUCING POLYOLEFINS

[75] Inventors: Masayoshi Hasuo, Yokohama; Yoshinori Suga, Machida; Masatoshi Suzuki, Fujisawa; Nobuaki Goko; Yasuhiro Nishihara, both of Kurashiki, all of Japan

[73] Assignee: Mitsubishi Chemical Industries Limited, Tokyo, Japan

[21] Appl. No.: 257,602

[22] Filed: Apr. 27, 1981

[30] Foreign Application Priority Data

May 2, 1980 [JP] Japan .................................. 55-59295

[51] Int. Cl.³ .......................... C08F 4/64; C08F 10/04
[52] U.S. Cl. ................................ 526/142; 252/429 B; 526/351; 526/903
[58] Field of Search ................................ 526/142, 903

[56] References Cited

U.S. PATENT DOCUMENTS

| | | | |
|---|---|---|---|
| 3,278,511 | 10/1966 | Lavger | 526/903 |
| 3,622,552 | 11/1971 | Fukuda et al. | 526/142 |
| 4,107,412 | 8/1978 | Welch | 526/903 |
| 4,107,415 | 8/1978 | Giannini et al. | 526/903 |
| 4,258,161 | 3/1981 | Kakogawa et al. | 526/142 |

FOREIGN PATENT DOCUMENTS

| | | | |
|---|---|---|---|
| 55-9001 | 3/1980 | Japan . | |
| 55-9404 | 3/1980 | Japan . | |
| 1128090 | 9/1968 | United Kingdom | 526/142 |
| 1128724 | 10/1968 | United Kingdom | 526/142 |

*Primary Examiner*—Edward J. Smith
*Attorney, Agent, or Firm*—Oblon, Fisher, Spivak, McClelland & Maier

[57] ABSTRACT

A process for producing a polyolefin characterized by polymerizing an olefin in the presence of a catalytic system composed of solid titanium trichloride, an organic aluminum compound, an aromatic hydrocarbon and a monocarboxylic acid ester having an olefinic double bond or an aromatic ring in the molecule thereof.

11 Claims, No Drawings

PROCESS FOR PRODUCING POLYOLEFINS

BACKGROUND OF THE INVENTION

This invention relates to a process for producing polyolefins. More particularly, it relates to a process for polymerizing olefins by the use of a catalytic system composed of solid titanium trichloride, an organic aluminum compound and a specific combination of electron-donative compounds.

DESCRIPTION OF THE PRIOR ART

It is well known that in the polymerization of olefins and particularly the stereospecific polymerization of α-olefins using catalytic systems composed of solid titanium trichloride catalysts and organic aluminum compounds, electron-donative compounds are used as a third component. One of purposes of using an electron-donative compound as a third component of the catalytic system is to improve more or less the stereospecificity or stereoregularity of a produced polymer by which secondarily produced amorphous polymers are reduced in amount, leading to an improved yield of a crystalline polymer or to an improved stiffness of a molded article from the produced polymer. Another purpose is to improve properties of a powder of produced polymer such as a bulk density, a distribution of particle size and the like, which facilitate easy handling or transfer of a powder or slurry of polymer or which enables a capacity of a reactor to be reduced. In order to achieve these purposes, a great number of investigations have been made up to now with a measure of success as is well known in the art. For instance, in Japanese Patent Publication Nos. 44-21337 and 49-4832, there are proposed processes in which in the polymerization of propylene using catalytic systems composed of titanium trichloride which is obtained by reducing $TiCl_4$ with Al, then grinding to pieces and activating the reduced product and organic aluminum compounds such as diethylaluminum monochloride, there are employed as a third component carboxylic derivatives such as methacrylic esters or acrylic esters or vinyl esters such as ethyl vinyl ether thereby improving the stereospecificity of polypropylene. Further, in Japanese Patent Publication No. 46-12140, there is proposed a process in which benzoic derivatives such as ethyl benzoate are used as a third component to similarly improve the stereospecificity of polypropylene. When such oxygen-containing compounds as mentioned above are used as a third component, the stereospecificity of produced polymer can be improved and the rate of polymerization is scarecely lowered. In these respects, such compounds are one of third components useful from a viewpoint of industry. In addition, in Japanese Patent Publication No. 39-19546, there is proposed a process in which when propylene is polymerized in an aliphatic or alicyclic saturated hydrocarbon solvent substantially free of oxygen-containing compounds by using a catalytic system composed of titanium trichloride and an organic aluminum compound, aromatic hydrocarbons such as toluene are used as a third component or as a part of the solvent for polymerization to improve the stereospecificity and the bulk density of polymer powder. In this connection, in Japanese Patent Publication No. 55-9001 some of the present inventors have proposed a process in which a catalytic system composed of a highly active titanium trichloride-base catalytic complex, an organic aluminum compound and an aromatic hydrocarbon is used to polymerize propylene to obtain polypropylene of high stereospecificity and high bulk density of polymer powder in high catalytic efficiency.

On the other hand, with packaging films which are one of important applications of polypropylene, their transparency and impact resistance are a factor which gives a great influence on their commercial value. Both the transparency and impact resistance should preferably be greater. According to the investigation of the present inventors, it was found that when propylene was polymerized using a catalytic system in which known electron-donative compounds are employed as a third component, there was obtained polypropylene having high stereospecificity and high bulk density of polymer powder, however, when this polymer was extruded to give a water-cooled blown film or a T-die film, its transparency as well as impact resistance was lowered. Additionally, when the stereospecificity of produced polymer is more improved by increasing an amount of the third component, the stiffness or rigidity of film is more improved but the lowering of the transparency and impact resistance becomes more considerable. The reason for this is not known but it has been found by the present inventors that one of factors which are closely correlated with the transparency and impact resistance of film is a distribution of molecular weight of a polymer which in turn shows a close correlation with the kind and quantity of a third component used on polymerization. That is, where known electron-donative compounds are employed, the stereospecificity of polymer is, of course, improved and at the same time a distribution of molecular weight is also increased with the attendant tendency of lowering the transparency and impact resistance of film. The reason why there is a correlation between the both properties of film and the distribution of molecular weight is not known at the present stage of our investigation. We have made an intensive study to overcome the above disadvantage by preventing the distribution of molecular weight from being increased and, as a result, found that when a certain combination of electron-donative compounds is used as a third component, the distribution of molecular weight is held small though the stereospecificity is improved, resulting in improved transparency and impact resistance of film. The present invention is accomplished based on the above finding, which is a surprising fact that can not be foreseen from known techniques. The present invention is advantageous from a viewpoint of production process since there can be obtained, according to the process of the invention, a polymer having a satisfactorily high stereospecificity and a high bulk density at high catalytic activity, i.e. in high catalytic efficiency, by the synergistic effect of catalysts and co-catalysts, making it possible to omit a step of removing amorphous polymer and to rationalize a step of removing a remaining catalyst.

SUMMARY OF THE INVENTION

Accordingly, one object of the present invention is to provide a polymer having a satisfactorily high stereospecificity and a high bulk density at high catalytic activity, i.e. in high catalytic efficiency, by the synergistic effect of catalysts and co-catalysts, making it possible to omit a step of removing amorphous polymer and to rationalize a step of removing a remaining catalyst.

The present invention provides a process for producing polyolefins which is characterized by polymerizing an olefin by the use of a catalytic system composed of solid titanium trichloride, an organic aluminum compound, an aromatic hydrocarbon and a monocarboxylic acid ester having an olefinic double bond or an aromatic ring in the molecule thereof.

DETAILED DESCRIPTION OF THE PREFERRED EMBODIMENTS

The present invention provides a process for producing polyolefins which is characterized by polymerizing an olefin by the use of a catalytic system composed of solid titanium trichloride, an organic aluminum compound, an aromatic hydrocarbon and a monocarboxylic acid ester having an olefinic double bond or an aromatic ring in the molecule thereof.

The present invention will be described in detail.

The solid titanium trichloride used as a catalyst may be pure titanium trichloride obtained by reducing titanium tetrachloride with hydrogen, a titanium trichloride-aluminum trichloride eutectic mixture (TiCl$_3$·$\frac{1}{3}$AlCl$_3$) obtained by reducing titanium tetrachloride with aluminum, and mechanically ground pieces of these titanium trichloride. In this connection, in order to simplify or omit a step of removing the catalyst and to impart good powder characteristics to the obtained polymer, it is preferable to use solid titanium trichloride catalytic complexes to be a catalyst of high activity. These solid titanium trichloride catalytic complexes are particularly described in Japanese Laid-open Nos. 47-34478, 48-64170, 50-112289, 50-143790, 51-16297, 51-16298, 51-76196 and 51-123796. That is, the complexes are those which has such an aluminum content that an aluminum to titanium atomic ratio is in the range of below 0.15, preferably below 0.1 and most preferably below 0.02 and which contains a complexing agent. The amount of the complexing agent is determined such that a molar ratio of the complexing agent to titanium trichloride in the solid titanium trichloride catalytic complex is in the range of above 0.001, preferably above 0.01. In particular, the catalytic complexes are those which contain titanium trichloride, an aluminum halide having an atomic ratio of aluminum to titanium of the titanium trichloride of below 0.15 and expressed by the formula, AlR$^1_p$X$_{3-p}$ (in which R$^1$ represents a hydrocarbon group having 1-20 carbon atoms, X represents a halogen atom, and p is a value of $0 \leq p \leq 2$), and a complexing agent contained in a molar ratio to the titanium trichloride of above 0.001. For example, there are mentioned complexes represented by the formula, TiCl$_3$·(AlR$^1_p$X$_{3-p}$)$_s$·(C)$_t$ (in which R$^1$ is a hydrocarbon group having 1-20 carbon atoms, X represents a halogen atom, p is a value of $0 \leq p \leq 2$, C represents a complexing agent, s is a value of below 0.15, inclusive, and t is a value of about 0.001, inclusive). As a matter of course, aside from TiCl$_3$ component, AlR$^1_p$X$_{3-p}$ component and C component as a complexing agent, a small amount of iodine may be contained or part or all of chlorine of the titanium trichloride may be replaced by iodine or bromine, or an inorganic solid as carrier such as MgCl$_2$, MgO or the like and a powder of olefin polymer such as polyethylene, polypropylene or the like may be contained. The complexing agent C may be ethers, thioethers, ketones, carboxylic acid esters, amines, carboxylic acid amides, polysiloxanes and the like, of which ethers or thioethers are preferable. Useful ethers or thioethers are those represented by the general formula R$^2$—O—R$^3$ or R$^2$—S—R$^3$, respectively, (in which each R$^2$ and each R$^3$ are independently a hydrocarbon group having below 15 carbon atoms). Examples of the compounds of AlR$^1_p$X$_{3-p}$ include AlCl$_3$, AlR$^1$Cl$_2$ and the like.

Preferably, the solid titanium trichloride catalytic complex has such an X-ray diffraction pattern that a halo of maximum intensity is located at a position ($2\theta$ = about 32.9°) corresponding to a maximum peak of 6$\delta$-titanium trichloride. In addition, it is preferable that the complex has never undergone any heat history exceeding 150° C. at the time of the production thereof. Most preferably, the complexes have such a pore capacity of very fine pore sizes that a cumulative capacity of pores having a radius ranging 20 Å-500 Å is in the range of above 0.02 cm$^3$/g, preferably 0.03 cm$^3$/g-0.15 cm$^3$/g in view of a fact that there is no need of removing amorphous polymer. The solid titanium trichloride catalytic complex can be readily prepared by the following methods:

(a) Titanium trichloride is liquefied in the presence of an ether or thioether to give a liquid matter, from which the complex is precipitated at temperatures of below 150° C.; and (b) Solid titanium trichloride obtained by reducing titanium tetrachloride with an organic aluminum compound or metallic aluminum is treated with a complexing agent and a halogen compound.

In the above method (a), the liquid matter containing liquefied titanium trichloride can be obtained by the following two procedures.

(A) A method in which starting titanium tetrachloride is reduced with an organic aluminum compound in the presence of an ether or thioether and, if necessary, a suitable hydrocarbon solvent.

(B) A method of treating starting solid titanium trichloride with an ether or thioether, if necessary, in the presence of a suitable hydrocarbon solvent.

Fine particles of solid titanium trichloride catalytic complex may be precipitated by any of known methods. For instance, the liquid matter is heated, as it is or after addition of a hydrocarbon diluent, if desired, to temperatures of below 150° preferably 40°-120° C. and most preferably 60°-100° C. for precipitation.

In case where a total of moles of titanium and aluminum in the titanium trichloride liquid matter are smaller than moles of an ether or thioether, a freeing agent may be added to accelerate the precipitation. Preferable examples of the freeing agent include titanium tetrachloride, aluminum halides such as aluminum trihalides, alkylaluminum dihalides and the like. The amount of the agent is preferably in the range of below 5 times by mole that of titanium in the liquefied matter.

The complexing agents used in the method (b) are those mentioned hereinbefore as the complexing agent C. Mentioned as the halogen compounds are titanium tetrachloride and carbon tetrachloride. The treatment with a complexing agent and that with a halogen compound may be conducted simultaneously, but it is possible to first conduct the treatment with a complexing agent and then the treatment with a halogen compound. The treatment with complexing agent is ordinarily conducted by adding, in diluent, to solid titanium trichloride a complexing agent in an amount of 0.2-3 times by mole that of TiCl$_3$ and treating the mixture at a temperature of $-20°$-80° C. After the treatment, the resulting solid is preferably separated and washed. The treatment with halogen compound is usually conducted in diluent at a temperature of $-10°$-50° C. The amount of the halogen compound is generally in the range of 0.1-10 times by mole, preferably 1–5 times by mole, of TiCl$_3$. After the treatment with halogen compound, the resulting solid is preferably separated and washed.

On the other hand, it is preferred to use, as an organic aluminum compound to be a cocatalyst, a compound represented by the general formula AlR$^4_n$Cl$_{3-n}$ (in which R$^4$ represents a hydrocarbon group having 1-°-carbon atoms and n is a value of 1.95–2.10). Though the compound of the formula where R$^4$ is an ethyl group and n is 2, i.e. diethylaluminum monochloride, may be satisfactorily used, cocatalysts described in Japanese Laid-open Nos. 54-107989 and 55-38833, i.e. those of the formula where R$^4$ is a normal propyl group of a normal hexyl group, are most preferable. Where R$^4$ is a normal propyl group or a normal hexyl group, it is important that n is in the range of $1.95 \leq n \leq 2.10$. When n is within such a range as indicated above, the cocatalyst used in combination with the afore-indicated solid titanium trichloride catalytic complex can produce good results with respect to both the polymerization activity and the stereospecificity of polymer.

Of the two third components, the aromatic hydrocarbons may be those which have a substituent such as a hydrocarbon group including an alkyl group, an alkenyl group or the like, or a halogen. In particular, there are mentioned monocyclic aromatic hydrocarbons such as benzene, toluene, ethylbenzene, xylene, styrene, n-propylbenzene, ethyltoluene, trimethylbenzene, tetramethylbenzene, chlorobenzene and the like, and polycyclic aromatic hydrocarbons such as diphenyl, diphenylmethane, triphenylmethane, naphthalene, methylnaphthalene, dimethylnaphthalene, vinylnaphthalene, phenanthrene, anthracene, vinylanthracene and the like. For reasons that the component is convenient to be of the same type as a solvent used for the preparation of the complex or prepolymerization from a viewpoint of recovering the solvent when the afore-indicated solid titanium trichloride catalytic complex is used, that it is advantageous that the component is inexpensive and easy to handle, and that it is volatile on drying of polymer, there are preferably employed the monocyclic aromatic hydrocarbons such as benzene, toluene, and xylene which may serve as the solvent and which are liquids of relatively low boiling points at a normal temperature.

The monocarboxylic acid esters having an olefinic double bond or an aromatic ring in the molecule thereof (hereinafter referred to as unsaturated monocarboxylic acid ester) are those olefinic monocarboxylic acid esters and aromatic monocarboxylic acid esters having 25 or less carbon atoms. Examples of the olefinic monocarboxylic acid ester include methyl, ethyl and butyl esters of arcylic acid; methyl, ethyl and butyl esters of methacrylic acid; methyl, ethyl and butyl esters of crotonic acid; methyl, ethyl and butyl esters of angelic acid; methyl, ethyl and butyl esters of tiglic acid, and methyl, ethyl and butyl esters of 2-pentenoic acid. Examples of the aromatic monocarboxylic acid ester include methyl, ethyl, butyl, amyl and octyl esters of benzoic acid; methyl, ethyl and butyl esters of toluic acid; methyl, ethyl and butyl esters of dimethylbenzoic acid; methyl, ethyl and butyl esters of ethylbenzoic acid; methyl, ethyl, butyl, amyl and octyl esters of α-naphthoic acid, methyl, ethyl butyl, amyl and octyl esters of β-naphthoic acid; methyl, ethyl, butyl, amyl and octyl esters of anthracene-1-carboxylic acid; methyl, ethyl, butyl, amyl and octyl esters of anthracene-2-carboxylic acid, and methyl, ethyl, butyl, amyl and octyl esters of anthracene-9-carboxylic acid. Further, there may be used aromatic esters of saturated aliphatic monocarboxylic acids having 25 or less carbon atoms such as phenyl acetate, benzyl acetate, phenyl propionate, benzyl propionate and the like.

The hydrogen atom of the aromatic ring of the above-mentioned compounds may be substituted with an alkyl group or a halogen atom.

Of these unsaturated monocarboxylic acid esters, preferable ones include methyl, ethyl and butyl esters of methacrylic acid; methyl, ethyl and butyl esters of benzoic acid; methyl, ethyl and butyl esters of toluic acid; and phenyl acetate in view of their less tendency of lowering the polymerization activity and their ready availability. The ratios of the respective components of the catalytic system are such that molar ratios of titanium trichloride: organic aluminum compound: aromatic hydrocarbon: unsaturated monocarboxylic acid ester are generally in the range of 1:1–100:1–10000:0.01–10, preferably 1:2–40:5–5000:0.05–2.

When the polymerization is conducted in hydrocarbon solvent, the amount of the aromatic hydrocarbon is in the range of 0.01–20 vol.%, preferably 0.1–10 vol.% based on the solvent. Less amounts are rather unsatisfactory in improving the transparency and impact resistance of film whereas larger amounts impose an undesirable burden when the aromatic hydrocarbon is recovered from the polymer or a solvent for polymerization.

In the practice of the invention, the catalytic system is prepared from the afore-mentioned solid titanium trichloride, organic aluminum compound and a third component composed of an aromatic hydrocarbon and an unsaturated monocarboxylic acid ester. The preparation of the catalytic system may be conducted by any of known methods. For instance, there are mentioned a method in which the above 4 components are mixed in a hydrocarbon solvent such as hexane, heptane, benzene, toluene or the like (in which if an aromatic hydrocarbon such as benzene or toluene is employed as a solvent, the total moles of the aromatic hydrocarbons used as a third component and the solvent should be used in such a ratio as defined hereinbefore), and a method in which two components, e.g. an organic aluminum compound and an unsaturated monocarboxylic acid ester, are initially mixed with each other. The mixing temperature and time are not critical but the temperature is preferably in the range of room temperature to a polymerization temperature and the time is preferred not to be too long and is generally within several days. Alternatively, the individual catalytic components may be fed to a polymerization vessel separately without having previously mixed with one another. The solid titanium trichloride may be used as it is for polymerization but is preferred to be pretreated with a small amount of the afore-mentioned olefin in the presence of an organic aluminum compound. This pretreatment is effective in improving the physical properties of a polymer slurry such as a bulk density.

The pretreatment is conducted at a temperature lower than the polymerization temperature, say 20°–60° C., in such a way that a ratio by weight of the polymer produced by the pretreatment/titanium trichloride in the solid titanium trichloride is in the range of 0.1–50/1, preferably 1–20/1. The solvent for the pretreatment may be aliphatic hydrocarbons such as hexane, heptane and the like and alicyclic hydrocarbons such as cyclohexane and use of an aromatic hydrocarbon itself to be added as a third component, e.g. benzene, toluene or the like is preferable in view of a fact that not only the stereospecificity of a final polymer but also the bulk density is improved.

In the practice of the present invention, the polymerization of olefin is conducted in the presence of a catalytic system composed of solid titanium trichloride, an organic aluminum compound and third catalytic component. The olefins include, for example, α-olefins such as propylene, butene-1, 3-methylbutene-1, 4-methylpentene-1, pentene-1, hexene-1 and the like. The polymerization may be any of a homopolymerization of these α-olefins, a random copolymerization of a mixture of these α-olefins with ethylene or a mixture of α-olefins, or a block copolymerization of α-olefins or a mixture of α-olefins with ethylene. The process of the present invention is particularly effective for the stereospecific polymerization to produce propylene homopolymer, a random copolymer containing 90 wt. % or more of propylene, or a block copolymer containing 80 wt. % or more of propylene.

The polymerization reaction may be conducted by a vapor phase polymerization or a slurry polymerization in the presence of a solvent. Examples of the solvent include aliphatic hydrocarbons such as pentene, heptane, hexane, decane and the like, and alicyclic hydrocarbons such as cyclohexane, methylcyclohexane and the like. Olefins themselves such as propylene are also preferably used. The polymerization reaction is feasible either by a batch-wise manner or continuously. The temperature and pressure of the polymerization is not critical but the temperature is generally in the range of 50°–100° C., preferably 60°–90° C. and the pressure is in the range of atmospheric pressure to about 100 atoms.

On polymerization, a known molecular weight-controlling agent such as hydrocarbon, a halogenated hydrocarbon or the like may be used to control a molecular weight of produced polymer.

The polymerization of olefin can be carried out as described above. The high polymerization activity and high stereospecificity attained by the process of the present invention becomes more pronounced when the process is applied to such a polymerization of high catalytic efficiency that a polymer is produced in an amount of above 5,000 grams, preferably above 10,000 grams, per gram of titanium trichloride (TiCl$_3$) containing in the solid titanium trichloride. By this, a quantity of catalyst remaining in the polymer can be more reduced with the attendant improvement of the stereospecificity of the polymer. Accordingly, such a polymerization of high catalytic efficiency as mentioned above is particularly preferable.

According to the polymerization process of olefins of the invention as described in detail hereinabove, not only good results are obtained with respect to the polymerization activity and stereospecificity of polymer, but also the resulting polymer is excellent in transparency and impact resistance when formed into films, thus the process of the invention producing more excellent effects as will not be experienced in prior art processes. Accordingly, the present invention has a great merit from an industrial viewpoint.

The present invention will be particularly described by way of examples and comparative examples. In Examples and comparative examples, the catalytic efficiency CE means a total quantity by gram of a produced propylene polymer per gram of titanium trichloride contained in solid titanium trichloride, and the polymerization activity K means a total quantity by gram of a produced propylene polymer per hour, per kg/cm$^2$ of propylene pressure and per gram of titanium trichloride. The term "total quantity of a produced propylene polymer" used herein means a quantity of polymers including amorphous polymer. The bulk density $\rho_B$ of a polymer powder was measured according to a procedure prescribed in JIS K-6721.

The abbreviation "II-XLN" means a ratio (wt. %), to a total polymer, of a residue which has been obtained by completely dissolving a polymer together with a stabilizer in boiling xylene, allowing the solution to gradually cool to room temperature, cooling the precipitated polymer by filtration, and washing it with xylene, showing a stereospecificity of the total polymer.

The melt flow index MFI of polymer was measured according to ASTM-D1238. The abbreviation FR means a ratio of a quantity of melted polymer extruded under a load of 5.528 Kg at a temperature of 230° C. to a quantity of melted polymer extruded under a load of 0.553 Kg at a temperature of 230° C., which is a simple procedure for determining an extent of a molecular weight distribution.

The haze (transparency) of film was measured according to ASTM-D1003 using a Haze Meter of Nippon Denshoku K. K., showing a transparency of film.

Further, the dart drop impact DDI of film was measured according to ASTM-D1709 by means of the DDI tester of Toyo Seiki K. K. using a semisphere of 1.5 inches and a height of 20 inches. This shows an impact resistance of film.

CATALYST-PREPARATORY EXAMPLE 1

(A) Preparation of Solid Titanium Trichloride Catalytic System

Into a 10 l autoclave which had been sufficiently substituted with nitrogen was charged 5.0 l of purified n-hexane, into which were further charged 2.7 moles of di-n-octyl ether and 3.0 moles of titanium tetrachloride under agitation. The inner temperature was controlled to be 30° C. and 0.5 l of an n-hexane solution containing 1.0 mole of diethylaluminum monochloride was added to the solution to give a brown uniform solution. The solution was heated and when the temperature exceeded 50° C., a purple, solid precipitate of fine particles was observed. The system was held at 95° C. for about 1 hour, after which the purple solid was separated and repeatedly washed to obtain 345 g of a titanium trichloride solid catalyst.

As a result of the elementary and gas-chromatographic analyses, this catalyst was found to have a composition TiCl$_3$.(AlCl$_3$)$_{0.004}$[(n-C$_8$H$_{17}$)$_2$O]$_{0.11}$.

(B) Pretreatment with Propylene 12.5 l of purified n-hexane was charged into a 20 l autoclave sufficiently substituted with nitrogen, into which were further charged under agitation 1.6 moles of diethylaluminum monochloride and the solid titanium trichloride catalytic complex obtained in (A) in such an amount that an amount of TiCl$_3$ was 250 g. Then, the inner temperature was controlled to be 30° C. and propylene gas was blown into the autoclave under agitation and the blowing of propylene was continued at the same temperature until polymerized propylene reached 1,250 g. Thereafter, the solid was separated and repeatedly washed with n-hexane to obtain polypropylene-containing titanium trichloride.

EXAMPLES 1-12 AND COMPARATIVE EXAMPLES 1-5

Into a 400 l reactor sufficiently substituted with nitrogen was continuously charged the polypropylene-containing solid titanium trichloride obtained in Preparatory Example 1 (B) in such amounts that the feed rate of $TiCl_3$ was as indicated in Table 1. Simultaneously, there were also continuously fed di-n-propylaluminum monochloride (hereinafter abbreviated as DPA) at a molar ratio of 8 to $TiCl_3$ ($DPA/TiCl_3=8$), such a kind and an amount of an aromatic hydrocarbon as indicated in Table 1 (the amount being represented by vol.% based on the n-hexane solvent and also by a molar ratio to $TiCl_3$), such a kind and an amount of an unsaturated monocarboxylic acid ester as indicated in Table 1 (the amount being represented by a molar ratio to $TiCl_3$, i.e. unsaturated monocarboxylic acid ester/$TiCl_3$), n-hexane, propylene and hydrogen. The polymerization was continuously conducted at 70° C. for an average residence time of 5.0 hours using a partial pressure of propylene of 13.0 kg/cm² and a molar ratio of hydrogen to propylene in gas phase of 0.045. The polymerization activity which was obtained from the feed rate of catalyst and the formation rate of polymer is shown in Table 1.

The polymer slurry was placed in a degasifying vessel to purge unreacted propylene and isopropanol was added so that the concentration of isopropanol in the inert solvent solution was 5 wt. %, followed by continuously treating at 70° C. and separating into a polymer cake and a filtrate by means of a centrifugal separator. The cake was dried to obtain a powder of a propylene polymer product and the filtrate was concentrated, so that an amorphous polymer dissolved in the solvent was separated and was collected. The ratio of the amorphous polymer to a total polymer is shown in Table 1 as a rate of formation of amorphous polymer.

To the thus obtained polymer powder were added 0.2 wt. % of BHT as an antioxidant and 0.3 wt. % of silica, followed by pelletizing at 250° C. in a pelletizer with an inner diameter of 40 mm and forming into a 30μ thick water-cooled, lay-flat film. This film was subjected to measurements of haze (transparency) and DDI (impact resistance). As for the pellets, FR was measured. These results are shown in Table 1.

In Examples 1-5, the polymerization is conducted using toluene as an aromatic hydrocarbon and various types of unsaturated monocarboxylic acid ester. In Comparative Examples 1-4, a known procedure using no aromatic hydrocarbon is conducted. When an unsaturated monocarboxylic acid ester alone is added to reduce a formation rate of amorphous polymer or increase the stereospecificity II-XLN, the haze of film increases or the transparency decreased. In this connection, however, when toluene is co-used as in Examples 1-5, the haze of film decreases, i.e. the transparency increases, with the attendant increase of the impact strength DDI. Further, it will be seen that FR which is an index of the molecular weight distribution is lowered. On the other hand, Comparative Example 5 shows that when an aromatic hydrocarbon alone is used, the transparency and impact resistance is satisfactory but a rate of formation of amorphous polymer is great and the stereospecificity II-XLN is low. This leads to a reduced yield of propylene polymer and a reduced stiffness of film.

Another advantage obtained by the process of the invention is that when a carboxylic acid ester alone is used to increase II-XLN, the lowering of polymerization activity K is relatively great but when toluene is used in combination, the lowering of K becomes small as is apparent from the comparison between Examples 1-5 and Comparative Examples 1-4.

In Examples 6-8, the amount of toluene are varied showing that the addition of only 0.2 vol. % of toluene produces the good effect.

In Examples 9-12, various aromatic hydrocarbons are used in which the rate of formation of the amorphous polymer is lowered and the stereospecificity II-XLN is increased with the film being improved in transparency and impact resistance.

TABLE 1

| | Example No. | | | | | | | | | | | | Comparative Example No. | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 | 4 | 5 |
| Feed rate of TiCl₃ (g/hr.) | 1.65 | 1.63 | 1.85 | 1.69 | 1.76 | 1.64 | 1.67 | 1.62 | 1.71 | 1.68 | 1.70 | 1.70 | 1.98 | 2.03 | 2.08 | 1.66 | 1.62 |
| Aromatic hydrocarbon | toluene | toluene | toluene | toluene | toluene | toluene | toluene | toluene | benzene | xylene | tetramethylbenzene | naphthalene | nil | nil | nil | nil | toluene |
| Aromatic hydrocarbon/TiCl₃ (molar ratio) (vol. %) | 1.5 690 | 1.5 690 | 1.5 690 | 1.5 690 | 1.5 690 | 0.2 100 | 1.0 470 | 5.0 2,400 | 1.5 820 | 1.5 600 | 1.5 480 | 1.5* 380 | — — | — — | — — | — — | 1.5 690 |
| Unsaturated monocarboxylic acid ester | methyl methacrylate | isobutyl methacrylate | methyl tiglate | methyl benzoate | methyl toluate | methyl methacrylate | methyl methacrylate | methyl methacrylate | methyl methacrylate | methyl methacrylate | methyl methacrylate | methyl methacrylate | methyl methacrylate | isobutyl methacrylate | methyl benzoate | nil | nil |
| Unsaturated monocarboxylic acid ester/TiCl₃ (molar ratio) | 0.1 | 0.1 | 0.1 | 0.1 | 0.1 | 0.1 | 0.1 | 0.1 | 0.1 | 0.1 | 0.1 | 0.1 | 0.2 | 0.2 | 0.1 | — | — |
| Rate of formation of propylene polymer (kg/hr.) | 19.0 | 19.0 | 19.0 | 19.0 | 19.0 | 19.0 | 19.0 | 19.0 | 19.0 | 19.0 | 19.0 | 19.0 | 19.0 | 19.0 | 19.0 | 19.0 | 19.0 |
| Rate of formation of amorphous polymer (kg/hr.) | 0.25 | 0.28 | 0.25 | 0.25 | 0.25 | 0.25 | 0.25 | 0.24 | 0.27 | 0.26 | 0.30 | 0.31 | 0.26 | 0.30 | 0.65 | 1.05 | 0.82 |
| Catalytic activity CE (g/g) | 11,700 | 11,830 | 10,400 | 11,390 | 10,940 | 11,740 | 11,530 | 11,880 | 11,270 | 11,460 | 11,350 | 11,360 | 9,730 | 9,510 | 9,450 | 12,080 | 12,230 |
| Polymerization activity K | 180 | 182 | 160 | 175 | 168 | 181 | 177 | 183 | 173 | 176 | 175 | 175 | 150 | 146 | 145 | 186 | 188 |
| Bulk density ρ_B (g/cc) | 0.48 | 0.48 | 0.48 | 0.48 | 0.48 | 0.48 | 0.48 | 0.48 | 0.48 | 0.48 | 0.48 | 0.48 | 0.48 | 0.48 | 0.48 | 0.45 | 0.46 |
| Rate of formation of amorphous polymer (%) | 1.3 | 1.5 | 1.3 | 1.3 | 1.3 | 1.3 | 1.3 | 1.2 | 1.4 | 1.3 | 1.6 | 1.6 | 1.3 | 1.6 | 3.4 | 5.2 | 4.1 |
| Stereospecificity II-XLN (%) | 96.6 | 95.5 | 96.4 | 96.2 | 96.5 | 96.0 | 96.3 | 97.3 | 96.2 | 96.8 | 95.4 | 95.1 | 96.5 | 95.6 | 94.3 | 92.0 | 93.1 |
| MFI (g/10 min.) | 9.7 | 9.6 | 9.0 | 9.8 | 9.5 | 9.8 | 9.4 | 9.5 | 9.8 | 10.5 | 10.3 | 8.8 | 9.8 | 9.7 | 8.5 | 10.2 | 10.8 |
| FR | 34 | 35 | 34 | 36 | 35 | 38 | 37 | 34 | 35 | 34 | 35 | 36 | 44 | 42 | 41 | 35 | 35 |
| Transparency, haze (%) | 1.5 | 1.6 | 1.5 | 1.7 | 1.6 | 2.0 | 1.8 | 1.4 | 1.6 | 1.5 | 1.6 | 1.8 | 3.5 | 3.2 | 2.8 | 1.6 | 1.5 |
| Impact strength, DDI (g) | 210 | 165 | 205 | 130 | 175 | 115 | 120 | 185 | 175 | 210 | 180 | 135 | 85 | 85 | 70 | 160 | 175 |

*Weight % based on n-hexane solvent.

CATALYST-PREPARATORY EXAMPLE 2

(A) Preparation of Solid Titanium Trichloride Catalytic Complex

Into a 10 l autoclave sufficiently substituted with nitrogen was charged 5.0 l of purified toluene, into which were further charged under agitation 5.0 moles of di-n-butyl ether and 5.0 moles of titanium tetrachloride. The inner temperature was controlled to be 30° C. and then 0.7 l of a toluene solution containing 2.5 moles of diethylaluminum monochloride was added to obtain a brown uniform solution. When the solution was heated and the temperature exceeded about 40° C., a purple solid precipitate of fine particles appeared. The system was held at 95° C. for about 1 hour, after which the particulate purple solid was separated and repeatedly washed with toluene to obtain 778 g of a titanium trichloride solid catalytic complex.

The elementary and gas-chromatographic analyses revealed that this complex had a composition of $TiCl_3 \cdot (AlCl_3)_{0.003} \cdot [(n-C_4H_9)_2O]_{0.07}$.

(B) Pretreatment with Propylene 12.5 l of purified toluene was charged into a 20 l autoclave sufficiently substituted with nitrogen, into which were further charged under agitation 1.6 moles of diethylaluminum monochloride and the solid titanium trichloride catalytic complex obtained in (A) in such a way that an amount of $TiCl_3$ was 250 g. Then, the inner temperature was controlled at a level of 20° C. and blowing of propylene gas was commenced under agitation and continued at the same temperature until polymerized propylene reached 1,250 g. Thereafter, the solid was separated and repeatedly washed with toluene to obtain polypropylene-containing titanium trichloride. In Comparative Examples 6–9 appearing hereinafter, n-hexane was used instead of toluene.

Examples 13–18 and Comparative Examples 6–10

The polymerization was conducted in the same manner as in Example 1 except that the polypropylene-containing titanium trichloride obtained in Preparatory Example 2 (B) was used as the solid catalytic component, the kinds and amounts of aromatic hydrocarbon and unsaturated monocarboxylic acid ester were as shown in Table 2, and the feed rate of $TiCl_3$ was as shown in Table 2. Thereafter, the polymerization system was subjected to an isopropanol treatment, separation and drying to obtain a propylene polymer. Then, the polymer was formed into a water-cooled, lay-flat film for various measurements. These results are summarized in Table 2.

In Examples 13–18, various carboxylic acid esters are used in combination with toluene which is a solvent used in polypropylene-containing solid titanium trichloride slurry and, in Examples 17 and 18, xylene or benzene is further added to the combination for polymerization. As compared with the results of Comparative Examples 6–8, it will be apparent that combinations of carboxylic acid esters and aromatic hydrocarbons serve to reduce the rate of formation of amorphous polymer and to improve the transparency and impact resistance of film with the stereospecificity II-XLN being improved. In addition, a lowering of the polymerization activity is found to be small. These effects can not be attained when a carboxylic acid ester or an aromatic hydrocarbon is used singly but are obtained by the combination of these compounds.

TABLE 2

| | Example No. | | | | | | Comparative Example No. | | | | |
|---|---|---|---|---|---|---|---|---|---|---|---|
| | 13 | 14 | 15 | 16 | 17 | 18 | 6 | 7 | 8 | 9 | 10 |
| Feed rate of $TiCl_3$ (g/hr.) | 1.37 | 1.44 | 1.49 | 1.52 | 1.68 | 1.37 | 1.60 | 1.63 | 1.83 | 1.65 | 1.37 |
| Aromatic hydrocarbon | toluene | toluene | toluene | toluene | xylene | benzene | nil | nil | nil | nil | toluene |
| (vol. %) | 1.5 | 1.5 | 1.5 | 1.5 | 1.5 | 5.0 | — | — | — | — | 3.0 |
| Aromatic hydrocarbon/$TiCl_3$ (molar ratio) | 810 | 810 | 810 | 810 | 610 | 3,400 | — | — | — | — | 1,700 |
| Unsaturated monocarboxylic acid ester | methyl methacrylate | ethyl methacrylate | methyl benzoate | ethyl tiglate | phenyl acetate | methyl methacrylate | methyl methacrylate | methyl benzoate | methyl tiglate | phenyl acetate | nil |
| Unsaturated monocarboxylic acid ester/$TiCl_3$ (molar ratio) | 0.1 | 0.1 | 0.1 | 0.1 | 0.1 | 0.1 | 0.2 | 0.2 | 0.2 | 0.15 | — |
| Formation rate of propylene polymer (kg/hr.) | 19.0 | 19.0 | 19.0 | 19.0 | 19.0 | 19.0 | 19.0 | 19.0 | 19.0 | 19.0 | 19.0 |
| Formation rate of amorphous polymer (kg/hr.) | 0.21 | 0.21 | 0.21 | 0.21 | 0.23 | 0.20 | 0.23 | 0.25 | 0.23 | 0.27 | 0.86 |
| Catalytic efficiency CE (g/g) | 14,020 | 13,340 | 12,890 | 12,640 | 11,450 | 14,010 | 12,020 | 11,810 | 10,510 | 11,680 | 14,500 |
| Polymerization activity K | 216 | 205 | 198 | 194 | 176 | 216 | 185 | 182 | 162 | 180 | 223 |
| Bulk density $\rho_B$ (g/cc) | 0.48 | 0.49 | 0.48 | 0.48 | 0.48 | 0.48 | 0.48 | 0.48 | 0.48 | 0.48 | 0.47 |
| Formation rate of amorphous polymer (%) | 1.1 | 1.1 | 1.1 | 1.1 | 1.2 | 1.0 | 1.2 | 1.3 | 1.2 | 1.4 | 4.3 |
| Stereospecificity II-XLN (%) | 97.2 | 97.0 | 97.3 | 97.2 | 96.8 | 97.3 | 96.8 | 96.5 | 97.0 | 95.8 | 93.2 |
| MFI (g/10 min.) | 9.2 | 9.3 | 9.7 | 9.5 | 10.3 | 10.5 | 8.7 | 9.3 | 8.4 | 9.2 | 10.3 |
| FR | 35 | 35 | 36 | 36 | 35 | 34 | 43 | 42 | 44 | 43 | 35 |
| Transparency, haze (%) | 1.6 | 1.6 | 1.7 | 1.8 | 1.7 | 1.4 | 3.4 | 3.4 | 3.8 | 3.5 | 1.5 |
| Impact strength, | 180 | 170 | 140 | 145 | 175 | 205 | 85 | 70 | 75 | 80 | 175 |

TABLE 2-continued

| | Example No. | | | | | | Comparative Example No. | | | |
|---|---|---|---|---|---|---|---|---|---|---|
| | 13 | 14 | 15 | 16 | 17 | 18 | 6 | 7 | 8 | 9 | 10 |
| DDI (g) | | | | | | | | | | | |

CATALYST-PREPARATORY EXAMPLE 3

(A) Preparation of Solid Titanium Trichloride Catalytic Complex

Into a 10 l autoclave substituted sufficiently with nitrogen were charged 1.0 l of purified n-hexane and 2.0 moles of titanium tetrachloride. The inner temperature was controlled at a level of 5° C. and 2.0 l of an n-hexane solution containing 4.0 moles of ethylaluminum sesquichloride was added under agitation, followed by further agitation at 5° C. for 2 hours. Then, the reaction system was washed with n-hexane to obtain a reddish purple solid matter. The amount of n-hexane was made 3 l and the inner temperature was controlled to be 30° C. after which 0.42 l of di-isoamyl ether was added under agitation, followed by continuing the agitation for 1.5 hours at 30° C. The reaction system was washed with n-hexane and dried under reduced pressure to obtain a brown solid matter. Then, 8 moles of titanium tetrachloride was added and the agitation was continued at 35° C. for 2 hours, followed by washing with n-hexane to obtain about 400 g of a purple titanium trichloride solid catalytic complex.

The elementary and gas-chromatographic analyses revealed that this complex had a composition of $TiCl_3 \cdot (AlCl_3)_{0.02} \cdot [(i\text{-}C_5H_{11})_2O]_{0.11}$.

(B) Pretreatment with Propylene

Into a 20 l autoclave sufficiently substituted with nitrogen were charged 12.5 l of purified n-hexane and then, under agitation, 1.6 moles of diethylaluminum monochloride and 250 g of the solid titanium trichloride catalytic complex obtained in (A) calculated as $TiCl_3$. Then, the inner temperature was controlled to be 20° C. and blowing of propylene gas was commenced under agitation and was continued at the same temperature until polymerized propylene amounted to 1,250 g. The solid was separated and repeatedly washed with n-hexane to obtain polypropylene-containing titanium trichloride.

EXAMPLES 19-21 and Comparative Examples 11-13

The polymerization was conducted in the same manner as in Example 1 except that the polypropylene-containing solid titanium trichloride obtained in Preparatory Example 3 (B) was used as the solid catalyst component, the kinds and amounts of aromatic hydrocarbon and unsaturated monocarboxylic acid ester were as shown in Table 3, and the feed rate of $TiCl_3$ was as shown in Table 3, followed by treating with isopropanol, separation and drying to obtain propylene polymers. The polymers were each formed into a water-cooled, lay-flat film and subjected to measurements. These results are summarized in Table 3.

As described with reference to the foregoing examples, co-use of aromatic hydrocarbons results in improvements of transparency and impact resistance of film.

TABLE 3

| | Example No. | | | Comparative Example No. | | |
|---|---|---|---|---|---|---|
| | 19 | 20 | 21 | 11 | 12 | 13 |
| Feed rate of $TiCl_3$ (g/hr.) | 1.96 | 2.16 | 2.09 | 1.95 | 2.19 | 2.05 |
| Aromatic hydrocarbon | toluene | toluene | toluene | nil | nil | nil |
| Aromatic hydrocarbon (vol. %) | 1.5 | 1.5 | 1.5 | — | — | — |
| Aromatic hydrocarbon/$TiCl_3$ (molar ratio) | 570 | 570 | 570 | — | — | — |
| Unsaturated monocarboxylic acid ester | methyl methacrylate | phenyl acetate | methyl benzoate | methyl methacrylate | phenyl acetate | methyl benzoate |
| Unsaturated monocarboxylic acid ester/$TiCl_3$ (molar ratio) | 0.1 | 0.1 | 0.1 | 0.2 | 0.2 | 0.2 |
| Formation rate of propylene polymer (kg/hr.) | 19.0 | 19.0 | 19.0 | 19.0 | 19.0 | 19.0 |
| Formation rate of amorphous polymer (kg/hr.) | 0.29 | 0.27 | 0.30 | 0.30 | 0.27 | 0.50 |
| Catalytic Efficiency CE (g/cc) | 9,840 | 8,920 | 9,230 | 9,900 | 8,800 | 9,510 |
| Polymerization Activity K | 151 | 137 | 142 | 152 | 135 | 146 |
| Bulk density $\rho_B$ (g/cc) | 0.45 | 0.45 | 0.45 | 0.45 | 0.45 | 0.45 |
| Formation rate of amorphous polymer (%) | 1.5 | 1.4 | 1.6 | 1.6 | 1.4 | 2.6 |
| Stereospecificity II-XLN (%) | 95.6 | 96.3 | 95.4 | 95.8 | 96.4 | 94.8 |
| MFI (g/10 min.) | 8.8 | 8.7 | 9.5 | 9.3 | 8.5 | 9.2 |
| FR | 36 | 35 | 35 | 42 | 45 | 42 |
| Transparency, Haze (%) | 1.8 | 1.6 | 1.6 | 3.2 | 3.8 | 3.3 |
| Impact Strength, DDI (g) | 135 | 180 | 180 | 80 | 90 | 85 |

EXAMPLES 22-29 AND COMPARATIVE EXAMPLES 14-18

Into a 1.7 m³ reactor sufficiently substituted with nitrogen were continuously charged at 70° C. liquefied propylene and hydrogen, into which were further continuously charged the polypropylene-containing solid titanium trichloride ($TiCl_3$) obtained in Preparatory Example 1 (B), di-n-propylaluminum monochloride (DPA), aromatic hydrocarbon and various unsaturated monocarboxylic acid esters in such amounts as shown in Table 4. The DPA/$TiCl_3$ molar ratio was 8. Propylene was continuously polymerized at a partial pressure of propylene of 31 kg/cm², in a molar ratio of hydrogen to propylene in vapor phase of 0.06–0.065, at 70° C. and for an average residence time of 5.0 hours. The polymerization activity obtained from the feed rate of catalyst and the formation rate of polymer is shown in Table 4. Unreacted propylene was purged from the liquefied propylene slurry of polymer, after which a powder of polymer was continuously treated with propylene oxide gas at 120° C. The thus obtained powder product was incorporated with 0.2 wt. % of BHT and 0.3 wt. % of silica and then pelletized and formed into a water-cooled, lay-flat film in a manner similar to Examples 1–12, followed by measurements of DDI and FR. These results are summarized in Table 4.

In Examples 22–29, polymerization was conducted using aromatic hydrocarbons and unsaturated monocarboxylic acid esters in combination. As compared with cases of Comparative Examples 14–16 where unsaturated monocarboxylic acids alone were used for the polymerization, the haze of film is reduced or the transparency is improved and the impact strength DDI is apparently improved. Comparative Example 18 is a case where polymerization was conducted using an aromatic hydrocarbon alone and Comparative Example 17 is a case where any third component was not used. The films of the both comparative examples are satisfactory with respect to their transparency and impact resistance but the stereospecificity II-XLN is low, so that it is necessary to remove amorphous polymer in order to prevent the stiffness of film from being lowered.

TABLE 4

| | Example No. | | | | | | | | Comparative Example No. | | | | |
|---|---|---|---|---|---|---|---|---|---|---|---|---|---|
| | 22 | 23 | 24 | 25 | 26 | 27 | 28 | 29 | 14 | 15 | 16 | 17 | 18 |
| Feed rate of $TiCl_3$ (g/hr.) | 2.58 | 2.57 | 2.56 | 2.58 | 2.69 | 2.70 | 2.76 | 2.78 | 2.58 | 2.58 | 2.56 | 2.55 | 2.54 |
| Aromatic hydrocarbon | toluene | toluene | toluene | toluene | toluene | toluene | benzene | xylene | nil | nil | nil | nil | toluene |
| Aromatic hydrocarbon/$TiCl_3$ (molar ratio) | 3,550 | 3,500 | 3,300 | 3,300 | 400 | 1,500 | 2,500 | 3,200 | — | — | — | — | 3,600 |
| Unsaturated monocarboxylic acid ester | methyl methacrylate | methyl methacrylate | methyl benzoate | methyl toluate | methyl methacrylate | methyl methacrylate | methyl methacrylate | methyl methacrylate | methyl methacrylate | iso-butyl methacrylate | methyl benzoate | nil | nil |
| Unsaturated monocarboxylic acid ester/$TiCl_3$ (molar ratio) | 0.2 | 0.2 | 0.2 | 0.2 | 0.2 | 0.2 | 0.1 | 0.1 | 0.2 | 0.2 | 0.2 | — | — |
| Formation rate of propylene polymer (Kg/hr.) | 45.0 | 45.0 | 43.5 | 43.8 | 46.1 | 46.1 | 44.7 | 45.1 | 44.1 | 43.1 | 44.0 | 45.2 | 44.5 |
| Catalytic efficiency CE (g/g) | 17,400 | 17,500 | 17,000 | 17,000 | 17,100 | 17,100 | 16,200 | 16,200 | 17,100 | 16,700 | 17,200 | 17,700 | 17,500 |
| Polymerization activity K | 113 | 113 | 110 | 110 | 111 | 110 | 104 | 105 | 110 | 108 | 111 | 114 | 113 |
| Bulk density $p_B$ (g/cc) | 0.50 | 0.50 | 0.50 | 0.50 | 0.50 | 0.50 | 0.50 | 0.50 | 0.49 | 0.49 | 0.48 | 0.45 | 0.45 |
| Stereospecificity II-XLN (%) | 96.1 | 96.2 | 95.9 | 96.3 | 96.0 | 96.3 | 96.5 | 96.6 | 95.0 | 94.8 | 95.4 | 91.2 | 92.2 |
| MFI (g/10 min.) | 9.6 | 9.5 | 9.3 | 10.5 | 9.7 | 9.8 | 9.5 | 9.3 | 9.8 | 9.4 | 9.4 | 9.7 | 9.8 |
| FR | 35 | 35 | 36 | 36 | 37 | 37 | 34 | 34 | 45 | 43 | 43 | 35 | 34 |
| Transparency, haze (%) | 1.5 | 1.6 | 1.6 | 1.7 | 2.0 | 1.8 | 1.5 | 1.6 | 3.5 | 3.3 | 3.3 | 1.5 | 1.5 |
| Impact strength DDI (g) | 170 | 175 | 200 | 160 | 120 | 115 | 185 | 205 | 70 | 75 | 80 | 155 | 180 |

EXAMPLES 30–33 AND COMPARATIVE EXAMPLES 19–21

Example 22 was repeated except that the kinds and amounts of aromatic hydrocarbon and unsaturated monocarboxylic acid ester were as shown in Table 5. The results are summarized in Table 5. As compared with Comparative Examples 19–21 where unsaturated monocarboxylic acid esters were used singly for the polymerization, it is apparent that the films obtained by the examples of the invention show reduced haze, i.e. good transparency and also improved impact strength DDI. On the other hand, in Comparative Example 17, polymerization is conducted without use of any third component and in Comparative Example 18, the polymerization is carried out using an aromatic hydrocarbon alone. In either case, the transparency and impact resistance of films are satisfactory but the stereospecificity II-XLN is low.

TABLE 5

| | Example No. | | | | Comparative Example No. | | | | |
|---|---|---|---|---|---|---|---|---|---|
| | 30 | 31 | 32 | 33 | 19 | 20 | 21 | 17 | 18 |
| Feed rate of $TiCl_3$ (g/hr.) | 2.75 | 2.74 | 2.75 | 2.74 | 2.73 | 2.71 | 2.71 | 2.55 | 2.54 |
| Aromatic hydrocarbon | toluene | toluene | toluene | benzene | nil | nil | nil | nil | toluene |
| Aromatic hydrocarbon/$TiCl_3$ (molar ratio) | 3,200 | 3,200 | 500 | 1,800 | — | — | — | — | 3,600 |
| Unsaturated monocarboxylic ester | ethyl α-naphthoate | methyl β-naphthoate | methyl anthracene-1- | ethyl β-naphthoate | ethyl α-naphthoate | methyl β-naphthoate | methyl anthracene-1- | nil | nil |

TABLE 5-continued

|  | Example No. | | | | Comparative Example No. | | | | |
| --- | --- | --- | --- | --- | --- | --- | --- | --- | --- |
|  | 30 | 31 | 32 | 33 | 19 | 20 | 21 | 17 | 18 |
| Unsaturated monocarboxylic ester/TiCl$_3$ (molar ratio) | 0.2 | 0.2 | carboxy-late 0.2 | 0.2 | 0.2 | 0.2 | carboxy-late 0.2 | — | — |
| Formation rate of propylene polymer (Kg/hr.) | 44.8 | 45.0 | 45.0 | 44.6 | 42.6 | 42.8 | 43.9 | 45.2 | 44.5 |
| Catalytic efficiency CE (g/g) | 16,300 | 16,400 | 16,400 | 16,300 | 15,600 | 15,800 | 16,100 | 17,700 | 17,500 |
| Polymerization activity K | 105 | 106 | 106 | 105 | 101 | 102 | 104 | 114 | 113 |
| Bulk density $\rho_B$ (g/cc) | 0.50 | 0.49 | 0.50 | 0.50 | 0.50 | 0.50 | 0.49 | 0.45 | 0.45 |
| Stereospecificity II-XLN (%) | 96.5 | 95.7 | 96.0 | 96.4 | 95.1 | 94.2 | 95.3 | 91.2 | 92.2 |
| MFI (g/10 min.) | 11.1 | 10.8 | 9.5 | 9.6 | 9.8 | 9.0 | 9.1 | 9.7 | 9.8 |
| FR | 34 | 35 | 35 | 34 | 45 | 44 | 45 | 35 | 34 |
| Transparency, Haze (%) | 1.6 | 1.6 | 1.5 | 1.6 | 3.5 | 3.3 | 3.3 | 1.5 | 1.5 |
| Impact strength DDI (g) | 170 | 180 | 170 | 200 | 60 | 70 | 70 | 155 | 180 |

What is claimed as new and desired to be secured by Letters Patent of the United States is:

1. A process for producing a highly stereoregular olefin polymer, comprising:
polymerizing an olefin in the vapor phase in the presence of a catalytic system composed of a (1) solid titanium trichloride containing material of the formula: TiCl$_3$.(AlR'$_p$X$_{3-p}$)$_s$.(C)t wherein R' is a hydrocarbon group of 1-20 carbon atoms, X represents halogen, p is a value of $0 \leq p \leq 2$, s is a value of no more than 0.15, C is a complexing agent and t is at least 0.001; (2) an organoaluminum compound of the formula:
AlR$_n^4$Cl$_{3-n}$ wherein R$^4$ is a C$_1$-C$_{20}$ hydrocarbon group and n is a value of 1.95-2.10; (3) an aromatic hydrocarbon and (4) a monocarboxylic acid ester having an olefinic double bond or an aromatic ring in the molecule thereof, the molar ratio of the titanium trichloride: organoaluminum compound: aromatic hydrocarbon: monocarboxylic acid ester components ranging from 1:2-40:100-5000:0.05-2 in a hydrocarbon solvent.

2. A process for producing a highly stereoregular olefin polymer, comprising:
polymerizing an olefin under slurry polymerization conditions in the presence of a catalytic system composed of a (1) solid titanium trichloride containing material of the formula: TiCl$_3$.(AlR'$_p$X$_{3-p}$)$_s$.(C)t wherein R' is a hydrocarbon group of 1-20 carbon atoms, X represents halogen, p is a value of $0 \leq p \leq 2$, s is a value of no more than 0.001, C is a complexing agent and t is at least 0.001; (2) an organoaluminum compound of the formula: AlR$_n^4$Cl$_{3-n}$ wherein R$^4$ is a C$_1$-C$_{20}$ hydrocarbon group and n is a value of 1.95-2.10; (3) an aromatic hydrocarbon and (4) a monocarboxylic acid ester having an olefinic double bond or an aromatic ring in the molecule thereof, the molar ratio of the titanium trichloride: organoaluminum compound: aromatic hydrocarbon: monocarboxylic acid ester components ranging from 1:2-40:100-5000:0.05-2 in a hydrocarbon solvent.

3. A process according to claim 2, wherein said aromatic hydrocarbon is a monocyclic aromatic hydrocarbon.

4. A process according to claim 3, wherein said monocyclic aromatic hydrocarbon is benzene, toluene or xylene.

5. A process according to claim 1 or 2, wherein said aromatic hydrocarbon is a polycyclic aromatic hydrocarbon.

6. A process according to claim 1 or 2, wherein said monocarboxylic acid ester having an olefinic double bond in the molecule thereof is methyl, ethyl or butyl methacrylate.

7. A process according to claim 1 or 2, wherein said monocarboxylic acid ester having an aromatic ring is methyl, ethyl or butyl benzoate, methyl, ethyl or butyl toluate, or phenyl acetate.

8. The process of claim 1 or 2, wherein the amount of aromatic hydrocarbon is in the range of 0.02-20 volume percent based on the solvent.

9. The process of claim 1 or 2, wherein the solvent is pentane, heptane, hexane, decane, cyclohexane or methylcyclohexane.

10. The process of claim 1 or 2, wherein the solvent is propylene.

11. The process of claim 1 or 2, wherein said complexing agent is an ether, thioether, ketone, carboxylic acid, ester, an amine, a carboxylic acid amide or a poysiloxane.

* * * * *

UNITED STATES PATENT AND TRADEMARK OFFICE
CERTIFICATE OF CORRECTION

PATENT NO. : 4,381,383
DATED : April 26, 1983
INVENTOR(S) : MASAYOSHI HASUO ET AL It is certified that error appears in the above—identified patent and that said Letters Patent is hereby corrected as shown below:

In column 4, line 8, delete "60-titanium" and insert therefor --$\alpha$-titanium--;

In column 5, line 13, delete "group of a" and insert therefor --group or a--;

In column 7, line 24, delete "pentene" and insert therefor --pentane--;

In column 16, line 36, delete "CE (g/cc)" and insert therefor --CE (g/g)--;

In column 20, line 59, delete "acid, ester" and insert therefor --acid ester--.

Signed and Sealed this

Eleventh Day of October 1983

[SEAL]

Attest:

Attesting Officer

GERALD J. MOSSINGHOFF
Commissioner of Patents and Trademarks